United States Patent [19]
McVey

[11] 3,733,028
[45] May 15, 1973

[54] METHOD OF SPRAYING TURF AND THE LIKE

[76] Inventor: James B. McVey, Hill City, S. Dak.

[22] Filed: Mar. 12, 1971

[21] Appl. No.: 123,630

Related U.S. Application Data

[62] Division of Ser. No. 811,918, April 1, 1969, Pat. No. 3,612,356.

[52] U.S. Cl. ................................................. 239/10
[51] Int. Cl. ................................................. A62c 1/12
[58] Field of Search ........................... 239/1, 10, 310

[56] References Cited

UNITED STATES PATENTS

| | | |
|---|---|---|
| 2,760,820 | 8/1956 | Cirese ................................. 239/310 |
| 3,101,902 | 8/1963 | Chamberlain et al. ............... 239/310 |
| 3,592,385 | 7/1971 | Smith ..................................... 239/10 |
| 3,592,386 | 7/1971 | Tschudy, Jr. ........................... 239/10 |
| 3,464,626 | 9/1969 | Stamps et al. .......................... 239/10 |

Primary Examiner—Lloyd L. King
Attorney—Kenyon & Kenyon, Reilly Carr & Chapin

[57] ABSTRACT

The disclosure relates to a method and apparatus for spraying a predetermined mixture of liquid chemicals onto turf and the like. A small size panel truck is provided with a plurality of containers for housing liquid chemicals, a means for automatically mixing the chemicals in accordance with a predetermined selection, means for connecting an external water supply to the vehicle, and means for introducing chemicals into the water which is then ultimately applied to the turf or the like.

12 Claims, 1 Drawing Figure

PATENTED MAY 15 1973
3,733,028
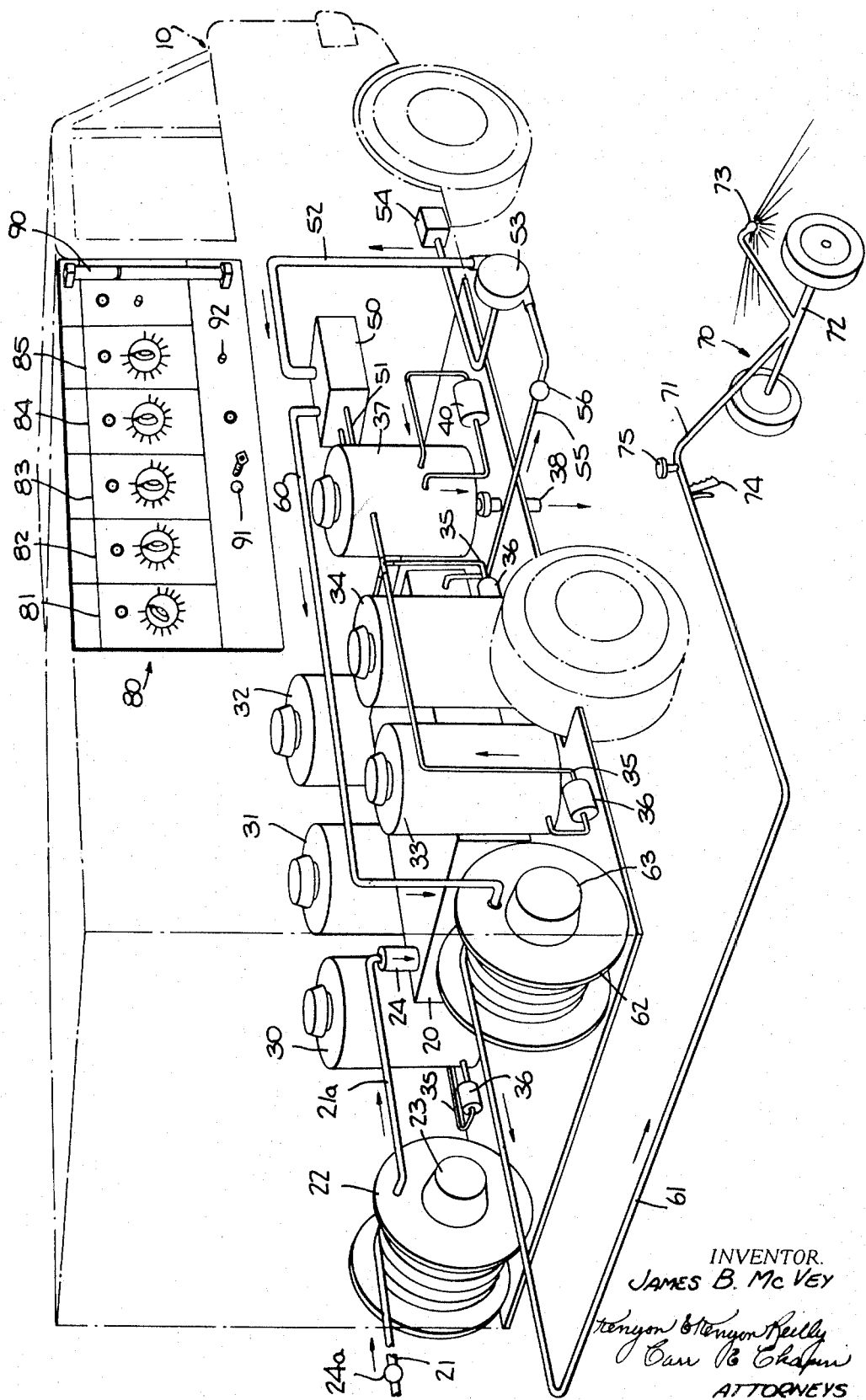
INVENTOR.
JAMES B. McVEY
ATTORNEYS 3,733,028

METHOD OF SPRAYING TURF AND THE LIKE

This is a division of application Ser. No. 811,918, filed Apr. 1, 1969 now U.S. Pat. No. 3,612,356.

BACKGROUND OF THE INVENTION

This invention relates generally to a method and apparatus for spraying turf and the like, and more particularly, to one wherein liquid chemicals are sprayed thereon.

Turf, shrubs, and other plants generally require the application of fertilizers and different disease controllers in order to sustain the desired appearance and growth. A variety of different applicators have been proposed in the past. Generally, the applicators provide for direct application of a granular material to the turf or plant being treated. This is particularly true in the case of the normal home lawn. Application of granular materials presents several drawbacks when contrasted to the direct application of a liquid material. Firstly, the granular material must be converted to a liquid form in order for the plant to be capable of accepting it into its root system. This necessitates an additional watering operation after application of the granular material. Secondly, the granular materials are considerably more expensive than the equivalent liquid chemicals, sometimes exceeding the cost of the liquid by more than five times. These drawbacks are further compounded by the fact that some of the chemicals are originally produced in a liquid form, then converted to a granular form so that they may be applied to the plant, and then must be reconverted back into a liquid for the plant to accept the chemical.

Numerous devices exist in the prior art for applying chemicals to plants, the more common of which are directed to means for applying granular materials. More recently, it has been proposed to directly apply the liquids to the plants from a vehicle. When services are provided to the normal type of home lawn, industrial site, or golf course, these liquid applicating vehicles have been of an unduly large size and present problems because of their excessive weight. This excessive weight is the direct result of the large amount of water carried in the vehicle and used in conjunction with the application of the chemicals. Further, these vehicles have been limited in that they are provided with means for carrying only one type of chemical. Particularly when dealing with turf, several types of different chemicals should be applied during various times of the growing season. For instance, different weed controllers are necessary during the different seasons of the year. The prior art spraying vehicles require that the vehicle designated to service the particular lawn must often make several trips in order to apply the different types of chemicals necessary. The method and apparatus proposed herein overcomes the deficiencies of the prior art and provides for a small size vehicle capable of servicing any particular lawn with a number of different chemicals determined in accordance with the needs of that lawn.

SUMMARY OF THE INVENTION

A small size panel truck is provided which contains therein a water storage member, a plurality of containers for housing different liquid chemicals a mixing means for blending the individual chemicals into a substantially uniform mixture, a means for introducing water into the storage member, means for withdrawing the water from the storage member, and a means for introducing the mixed liquid chemicals into the water which is then subsequently applied to the turf or the like. The vehicle is compact in size and does not become unduly heavy because of an excess water supply. In operation, the water is introduced into the vehicle from an external source available at the site of the lawn being treated. This permits the vehicle to be of a sufficiently small size so that local ordinances prohibiting large size vehicles do not become a problem. Further, the vehicle, since it contains facilities for carrying the different chemicals, is adapted to treat any type of lawn in accordance with its particular needs. This latter feature is particularly advantageous since the type of treatment required is generally not determined until the service man inspects the lawn.

Accordingly, it is a primary object of this invention to provide a simple and compact vehicle for treating turf and the like.

It is a further object of this invention to provide means for applying a plurality of liquid chemicals to turf and the like.

It is a still further object of this invention to provide a method and apparatus for applying liquid chemicals to turf and the like in combination with water supplied from a source external to the chemical containing vehicle.

These and other objects, advantages and features of the invention will become more apparent from the following description taken in conjunction with the accompanying drawing.

BRIEF DESCRIPTION OF THE DRAWING

The drawing depicts a schematic type perspective view of a vehicle containing a liquid chemical spraying apparatus.

DESCRIPTION OF THE PREFERRED EMBODIMENT

With reference to the drawing, the chemical spraying apparatus of this invention is contained in a small size panel type truck indicated at 10. In the rear compartment of the truck 10 is contained a water storage tank 20 which is connected to a hose 21 by means of the tubular conduit 21a. The hose 21, which is mounted on a rotatable cylindrical drum 22, has its free end available to be attached to any convenient water supply. The cylindrical drum 22 is provided with a takeup mechanism 23 which permits automatic retraction of the hose 21 from its extended position. A check valve 24a is provided to insure that the water flow is permitted only in the direction indicated and serves to preclude any backflow of water during the filling of the storage member 20. Storage member 20 also contains a float 24 to stop the water flow when it has been filled. Containers 30, 31, 32, 33 and 34 are provided to house the different liquid chemicals which are to be applied to the lawn. Each of the containers is vented to allow the liquid chemicals housed therein to be readily withdrawn. Each container has connected thereto a tubular conduit 35 which has mounted thereon a small pump 36 for transporting the liquid chemicals into the mixing tank 37. The mixing tank 37 is provided with a drain 38 through which any unused chemicals are readily flushed from the apparatus. A mixing or agitating mechanism is provided for the mixing container 37 by means of a small pump 40 having its inlet end connected to the mixing tank 37 as well as its discharge end. By operation of the pump 40, the liquid chemicals previously introduced into the mixing tank 37 are agitated and mixed by being passed through the pump in the direction of the arrows indicated.

A proportioning device is provided at 50 into which is introduced the previously mixed liquid chemicals from the tank 37 via conduit 51. Also introduced into the proportioning means 50 is a flow of water via the conduit 52. The water is removed from the storage member 20 by the pump 53 which in turn is driven from the vehicle's transmission by means of the power takeoff unit 54. Included on the conduit 55, which connects the pump 53 to storage member 20, is another check valve 56 to insure that no backflow of water is permitted. This is an additional safety measure to insure that the chemicals contained in the vehicle will not backflow through the system into the external water supply. As the pressurized water is passed through the proportioning means 50, it operates a water motor which is internally connected to a piston-type injector pump. The injector pump intermittently injects the liquid chemicals into the water stream and provides a thoroughly mixed chemical and water combination. One of the types of proportioning devices that has been found acceptable is the Smith Precision Co., Newbury Park, Calif., Model R-3, although other types may be substituted.

The combination of water and liquid chemical flows from the proportioning means 50 via the conduit 60 into the hose 61. Hose 61 is again mounted on a rotatable cylindrical drum 62, which has a takeup mechanism 63 for winding the hose onto the drum from its extended position. The hose 61 has its other end connected to a spraying mechanism 70. The spraying mechanism 70 comprises a bent tube 71 which is fixedly attached to a pair of wheels 72. At the free end of the tubular member 71 is a nozzle 73 which is directed toward the terrain or turf under treatment. A valve is provided at 74 which conveniently allows the operator to turn the system on and off. A flow meter at 75 may optionally be provided to provide the operator with information as to the quantity of chemicals applied to the terrain.

A control panel 80 is provided on the exterior of the truck 10. The control panel 80 is divided into five segments 81, 82, 83, 84 and 85. Each of these segments provides a control for the rate of flow from the five different vented containers 30, 31, 32, 33 and 34 containing the liquid chemicals to be applied. For example, each of the containers respectively is illustrated as containing a turf fertilizer, a weed control, a fungus control, a crabgrass control, and a root zone control. In operation, the operator will set the calibrated dials to a preselected number which is in accordance with the amount of liquid chemicals to be applied to the particular lawn. Each of the calibrated dials is an electric timer which when set operates the pump 36 associated with each container for a predetermined amount of time. By means of flow control valves in each of the conduits connecting the vented containers to the mixing tank, operation of the pump for any predetermined amount of time will render a predetermined amount of liquid chemical to be introduced into the mixing tank 37. Appropriate pilot lights are provided to give the operator an indication as to which of the liquid chemicals are being introduced into the mixing tank 37. A liquid sight gauge is provided at 90 so that the operator may readily see the amount of liquid contained in a mixing tank 37 which is ready for application on the lawn. Safety devices are also provided by means of a lock 91 on the exterior control panel 80 so that when the operator is treating the lawn the system may not be changed. A control button 92 for operating the agitating pump 40 is also provided on the exterior control panel so that any additional mixing of the chemicals may be provided.

Operation of the system is illustrated as follows:

an operator drives the vehicle to the site of the particular lawn to be treated. In accordance with either the owner's request or upon the operator's inspection of the site, a determination is made as to which chemicals are to be applied to the lawn. The operator will in accordance with this determination set the appropriate control dials on the control panel 80 to the predetermined quantity of chemicals necessary. He will then connect the flexible hose 21 to a water supply available at the site. This may be practically any type of water available. The storage member 20 is thereby provided with additional water to insure that a sufficient quantity is available to dilute the concentration liquid chemicals to be applied to the lawn. The liquid chemicals are pumped into the mixing tank 37 once the mechanism is activated. The operator then by pushing a button on the control panel may sufficiently agitate the chemicals introduced into the mixing tank 37 to provide for a uniform blend. The vehicle is maintained in the operating mode and the pump 53 is driven by the power takeoff unit 54 connected to the vehicle's transmission. The operator then simply removes the spraying means 70 from the vehicle and walks along the terrain to be treated. By activating the valve 74, liquid is applied to the areas across which he walks. By rolling the spraying means across the entire lawn under treatment, he may quickly and completely treat that area with a blend of each of the liquid chemicals necessary to adequately feed the lawn as well as control any disease that may exist in the lawn.

As is readily seen from the foregoing description, the method and apparatus disclosed herein provides for a convenient, simple and inexpensive means for treating any desired lawn. The vehicle is small in size and is flexible in that it may apply any variety of chemicals to the lawn under treatment. Further utilization of the invention described herein may be made in applying chemicals to sidewalks during winter to prevent freezing, in the cleaning of buildings or other similar applications.

Although the above description has been directed to a preferred embodiment of the invention, it is expressly understood that other variations and modifications may be made without departing from the spirit and scope thereof.

What is claimed is:

1. A method of treating turf and the like with liquid chemicals which comprises the steps of:
    a. introducing a supply of water into a storage member;
    b. introducing a plurality of liquid chemicals which are to be applied to the turf into a container;
    c. mixing the plurality of liquid chemicals introduced into the container;
    d. removing a continuous flow of water from the storage member;

e. replenishing at least a portion of the water removed from the storage member to maintain the water content therein sufficient to treat the turf;

f. injecting a predetermined quantity of the mixed liquid chemicals into the continuous flow of water so that the desired ratio of chemical to water is attained; and g. applying the water containing the previously injected liquid chemicals therein to the turf.

2. The method of claim 1 wherein the step of introducing a supply of water into a storage member comprises connecting a supply of water to the storage member and introducing water into the storage member to replenish that removed in an amount sufficient to substantially maintain the liquid content therein constant.

3. The method of claim 1 wherein the plurality of liquid chemicals introduced into the container are introduced therein in predetermined quantities.

4. The method of claim 1 wherein the step of introducing a plurality of liquid chemicals into a container includes introducing each of the liquid chemicals into the container for a predetermined time interval and at a predetermined flow rate thereby introducing a predetermined quantity of each liquid chemical into the container.

5. The method of claim 1 wherein the step of removing a continuous flow of water from the storage member comprises pumping water from the storage member at a predetermined flow rate and at a pressure sufficient to allow application thereof on the turf.

6. The method of claim 1 wherein the step of mixing the plurality of liquid chemicals introduced into the container includes pumping the liquid chemicals out of the container and subsequently returning the liquid chemicals to the container under pressure to insure sufficient agitation and mixing thereof.

7. The method of claim 1 wherein the step of applying the water containing the previously injected liquid chemicals therein to the turf comprises passing a spraying means across confined areas of the terrain until substantially the entire terrain under treatment has been treated with the desired liquid chemicals.

8. A method of operating a machine for applying liquid chemicals to turf and the like which comprises the steps of:

a. connecting a supply of water to the machine;

b. introducing water into a storage member contained on the machine;

c. removing water from the storage member under pressure and at a predetermined rate of flow;

d. introducing a predetermined quantity of liquid chemical into the water removed from the storage member;

e. replenishing the water removed from the storage member to maintain the water content therein substantially constant; and f. applying the water containing the liquid chemical introduced therein to the turf.

9. A method in accordance with claim 8 which further includes introducing a plurality of liquid chemicals into a container on the machine, mixing the plurality of liquid chemicals introduced into the container, and introducing a predetermined quantity of the liquid chemicals into the water removed from the storage member.

10. A method in accordance with claim 9 wherein each of the plurality of liquid chemicals introduced into the liquid container is introduced therein for predetermined time intervals and at a predetermined flow rate thereby introducing a predetermined quantity of each liquid chemical into the container.

11. A method in accordance with claim 8 wherein the step of removing water from the storage member includes pumping water from the storage member at a predetermined flow rate and at a pressure sufficient to allow application thereof on the turf.

12. A method in accordance with claim 8 wherein the step of applying water containing the liquid chemical introduced therein to the turf comprises passing a spraying means across confined areas of the terrain until substantially the entire terrain under treatment has been treated with the desired liquid chemicals.

* * * * *